United States Patent [19]

Hainey

[11] Patent Number: 4,960,278
[45] Date of Patent: Oct. 2, 1990

[54] GOLFER'S COMBINED DIVOT REPAIR AND DISTANCE MEASURING DEVICE

[76] Inventor: Melvin F. Hainey, 10609 Pinehurst Dr., Austin, Tex. 78747

[21] Appl. No.: 503,794

[22] Filed: Apr. 2, 1990

[51] Int. Cl.⁵ .......................... A63B 57/00; G01B 3/10
[52] U.S. Cl. .......................... 273/32 B; 273/DIG. 21; 33/760; 33/767
[58] Field of Search ................. 273/32 R, 32 B, 32 H, 273/34 R, DIG. 21; 33/760, 767, 768

[56] References Cited

U.S. PATENT DOCUMENTS

| | | | |
|---|---|---|---|
| 4,114,878 | 9/1978 | Hammond | 273/32 B |
| 4,273,329 | 6/1981 | Trigg | 273/34 R X |
| 4,502,226 | 3/1985 | Hung | 33/760 |
| 4,880,232 | 11/1989 | Lang | 33/760 X |

Primary Examiner—George J. Marlo

[57] ABSTRACT

A pocket-sized divot repair tool which has two strong, thin metal prongs rigidly attached to a disc-shaped handle which contains a spool of very fine, high-strength, man-made line of substantial length fastened to a hook-clamp which may be unsnapped from the handle, hooked around a golf flagstick and played out in order to measure relative distance to competing golf balls. The line is retrieved by opening a crank hinged to the spool, after which the crank is closed and the hook/clamp snapped back onto the handle locking itself and the spool firmly into place.

3 Claims, 2 Drawing Sheets

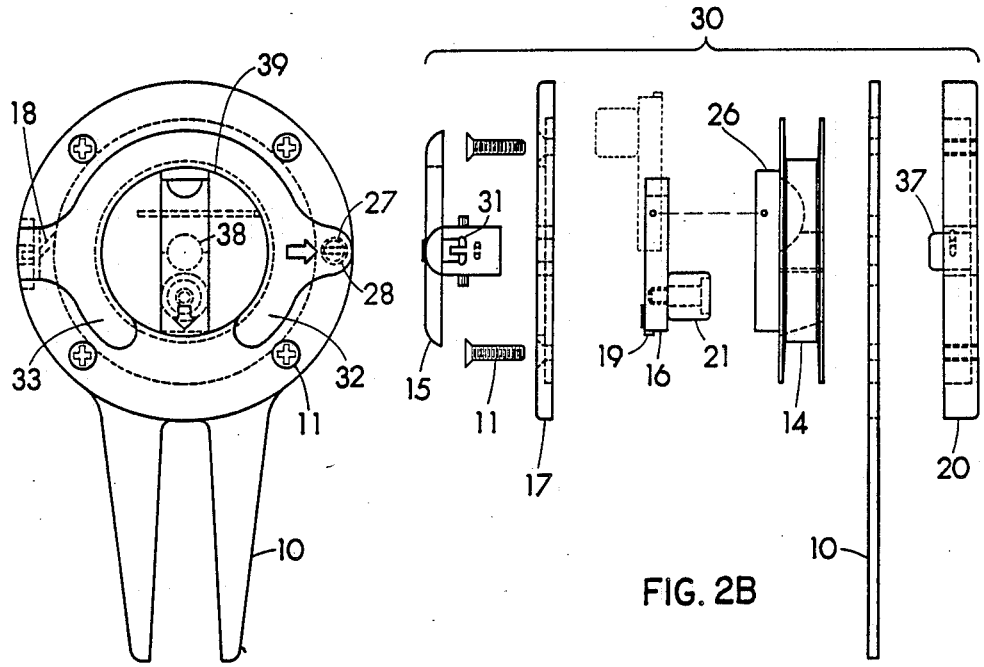
FIG. 2A
FIG. 2B
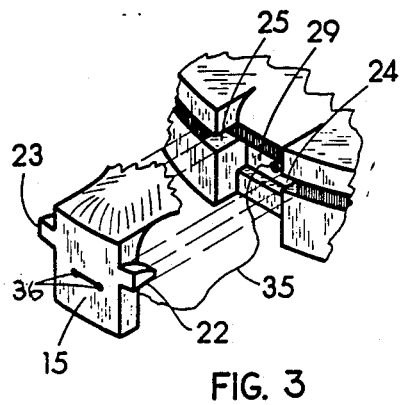
FIG. 3
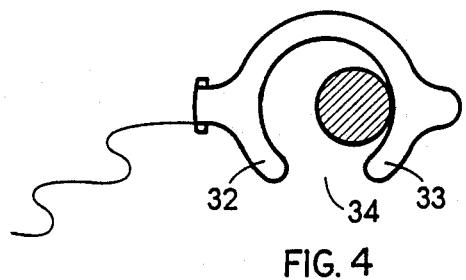
FIG. 4
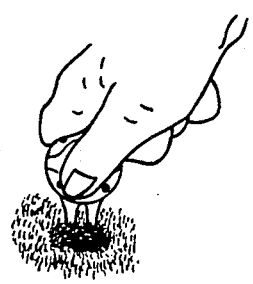
FIG. 5
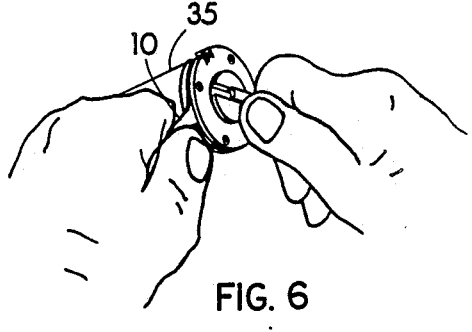
FIG. 6

GOLFER'S COMBINED DIVOT REPAIR AND DISTANCE MEASURING DEVICE

BACKGROUND-FIELD OF INVENTION

This invention relates to golf accessories, specifically to a small, pocket-sized device for repairing divots on golf course greens which can also be used for determining whose ball is closest to the hole.

BACKGROUND-DESCRIPTION OF PRIOR ART

Many divot repair tools have been invented, patented, and marketed, so that there is very little that can be novel about such a tool. Yet this is a tool that every golfer should carry during a round of golf. In fact, golf course managers and club professionals uniformly urge golfers to do so. Hence, if a novel and useful secondary function can be incorporated into the divot fixer, there is a good chance that it may be commercially successful. For example, one invention U.S. Pat. No. 4,535,987 Dikoff (1985) incorporates, in addition to a divot fixer, a cleat remover, a stroke counter, a bottle opener, a knife blade, a groove cleaner, and a ball marker. It has no distance measuring feature, and most of the functions it does perform would seldom be used by a golfer, adding only to the cost of the device. In fact, it becomes so cumbersome that it is sold with a clip to hold it. However, it is doubtful that very many golfers would be interested in a device that clipped to their belt or golf bag.

A distance measuring device is of interest to golfers because in many non-professional golf matches there is a game played within the match called "Greenies and Birdies" in which the player or team closest to the pin on the par three holes wins an extra bet. Birdies, one less than par, also win an extra bet. This game-within-a-game will probably be perpetuated as long as there is a game of golf because it favors the better players, since no handicap is involved, and the better players really run the game of golf. There are other times when it is important to know who's ball is farthest from the pin, because it must be played first. In a close match this can often make quite a bit of difference.

U.S. Pat. No. 4,273,329 Trigg and Portolan (1981) discloses a tool that performs precisely the two functions claimed for the present invention: divot repair and relative distance measurement. However, a different approach and a substantial improvement in the performance of both functions is claimed for the present invention. First, to repair a divot effectively, a strong twisting and prying force is required. As shown in FIG. 5 a twisting action is required to close in the wound caused by the ball while a prying action is required to lift the compacted sod up to ground level. The first embodiment of Trigg and Portolan's device, hinged, would be difficult to pry with, while the second embodiment could not apply a twisting force. To an experienced golfer who has repaired many divots, it would be immediately apparent that it would be very difficult to use their device for divot repair. Second, a coiled spring line retrieval mechanism necessarily limits the length of line that can be retrieved with any small device. Yet, to be really effective the device should be small enough to be carried in the user's pocket where it is readily available for use when needed. For balls that are close to the flag, the flag stick itself can be used for measurement. It is for balls that are some distance away that measurement is most important, and to measure a distance of, say, seventy-five feet with the Trigg and Portolan technique would require a device much larger than the small, pocket-sized device described below. It is perhaps for this reason that these inventors suggest attaching the device to an article of the golfer's clothing; e.g., the golfer's belt or trouser waistband. Again, such an idea will not appeal to very many golfers. Further with coil spring retrieval there is always the danger of a runaway retrieval, particularly if a ratchet device is employed as suggested. This could damage the tool and perhaps even hurt somebody. Also, the Trigg and Portolan device has a dangling hook or ring, whereas in the present invention, described below, the hook is snapped firmly into place and serves the important secondary functions of smoothing out the handle and locking the rotating spool firmly into place.

Hence, there does not appear to be any really good, small divot repair tool that can also be used effectively to measure the relative distance to golf balls that are at a considerable distance from the pin.

OBJECTS AND ADVANTAGES

The objects and advantages of the present invention are:

(a) to provide a strong divot repair tool with a disc-shaped handle large enough to provide a good grip yet small enough so that the device can easily be carried in a golfer's pocket.

(b) to provide a tool that, despite its small size, can, through the use of innovative man-made fibers such as Kevlar, contain a sufficient length of line to measure the relative distance from the flag stick of two or more balls under any normal golfing situation.

(c) to provide a rapid, trouble-free rewinding method for the line mentioned above.

(d) to provide a clamp at the outer end of the line that conveniently attaches to the flag stick and also acts as a locking device when returned to its place on the tool's handle.

(e) to provide a clamp that when in place acts as a fairing and smooths out the necessarily protruding parts of the handle mechanism on the spool of line.

(f) to provide special locking features for locking the clamp securely to the tool's handle.

A further object and advantage of this tool is that the back of the disc-shaped handle affords a perfectly flat circular area about the size of a silver dollar upon which advertising, company logos, instructions, or other pictorial or printed matter could be applied, thus adding to the marketabilty of the device.

DRAWING FIGURES

FIG. 2 shows a front elevation of the device with an exploded side view revealing details of the six major parts involved.

FIG. 3 shows the locking feature of one end of the removable hook/clamp.

FIG. 4 shows how the hook/clamp fits around a flagstick.

FIGS. 5 and 6 show, respectivly, use of the device to repair a divot and method of line retrieval.

DESCRIPTION-FIGS. 1 TO 4

Figure 1:
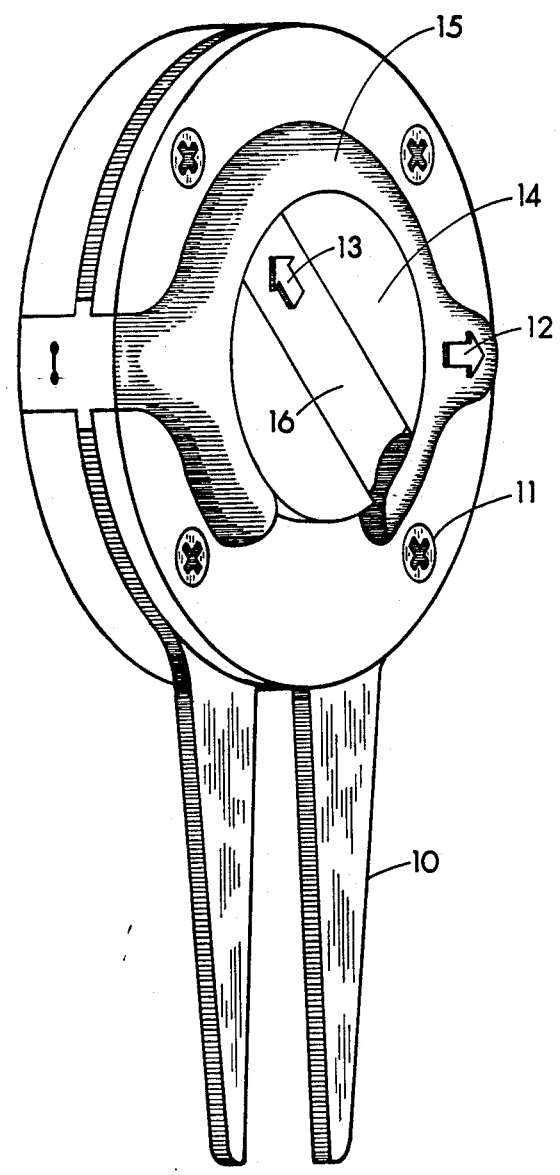
FIG. 1 is an isometric projection of the overall device showing its outward appearance.

FIG. 1 shows the generally clean exterior lines of the device. Size is very important because to be truly useful the tool must be small enough to be easily carried in the golfer's pocket. The availability of a very fine, strong man-made fiber such as Kevlar, trademark of E.I. DuPont DeNemours, Inc., which is five times stronger than steel by weight, is one of the main reasons that the device can be made small and still contain enough line to measure long distances. In one embodiment the tool is made entirely of high-impact plastic except for the divot repair prongs 10 which are made of steel or a comparable metal. The small screws 11 holding the device together could be stainless steel or plastic. The component parts will be described later.

The small raised arrows 12 and 13 point to fingernail nitches for releasing the hook/clamp 15 and the retrieving crank 16 which is hinged to the rotating spool 14.

The six major parts of the device shown in the exploded view 30 of FIG. 2 are hook/clamp 15, front cover 17, retrieving crank 16, rotating spool 14, divot repair prongs 10, and back cover 20. The hook/clamp is one of the most novel features of this invention. It fits into the left side of the main body as shown in FIG. 3 where the tapered ears 22 and 23 slide smoothly into matching slots 24 and 25 locking this end of the hook/clamp firmly into place when it is snapped over the protruding part 26 of the rotating spool 14 and into the hole 27 on the right hand side of the main body. The hole 27 in the front cover 17 is just slightly smaller than the raised portion of the peg 31 whereas the hole 28 in the divot repair prongs 10 is the same size as the raised portion of the peg 31. This allows the slotted peg to snap firmly into the hole. Also the inside diameter of the hook/clamp 15 is just slightly smaller than the protruding part 26 of the spool 14 so that there is a spring loading of the arms 32 and 33 of the hook/clamp 15 on the spool holding it firmly in place. Also, as shown in FIG. 4, the space 34 between the arms 32 and 33 is just slightly smaller than the standard one half inch diameter flagstick so the hook/clamp can be easily snapped on and off the latter. It may be seen in FIG. 3 that the measuring line 35 is attached to the hook/clamp by threading it through two small holes 36 and tying. There is a slight indentation in the main body at 29 to allow for the knot and any loose bits of line. The line is fed to and from the spool through the hole at 18 as shown in the elevation of FIG. 2.

The front cover 17 of FIG. 2 requires little explanation except to note that it provides one of the bearing surfaces for the rotating spool 14, fitting around the protruding part 26 of the spool 14 as seen in the elevation at 39. The other bearing surface for the spool is the cylindrical protrusion on the back cover at 37 which fits into a hole in the spool shown at 38 in the elevation. The back cover also has four equally spaced holes threaded to accept the fastening screws represented by 11.

The retrieval crank 16 is shown projected out from the spool 14 into which it fits snugly. It is hinged by a pin, not shown, and is held in place by friction. For retrieval it is swung out as shown in the ghosted illustration. A notch 19 is provided for lifting out the crank, and a freely rotating spinner knob 21 facilitates the rewinding process.

As shown in the pictorial drawing of FIG. 1 and by the hidden lines in the elevation of FIG. 2, the divot repair prongs are a part of a circular metal ring to which the front and back covers attach. This part is made of steel or a similar metal because it can then be thin enough to penetrate the ground easily, yet strong enough to apply the prying and twisting forces necessary to do a good job. Many other configurations have been tried, but steel in this shape seems to work best by far.

The back cover 20 like that of the front cover requires little explanation; however, as mentioned previously it is important for a device like this to have a clear space for advertising, and this back cover is ideal for that purpose.

OPERATION-FIGS. 5 AND 6

As a divot fixer this device would probably be used five to ten times or more during a round of golf. Hence it is important that it perform that operation well. It turns out that the disc shape which is ideal for the spool of line is also just about ideal as a handle for the divot repair function since it affords such a good solid gripping surface. Without doubt this device, used as shown in FIG. 5, works better than most divot repair tools that are available to a golfer.

To use the device for measuring, an operation that may be required only every other round or so, it is a simple matter to unsnap the hook/clamp, hook it around the flagstick and run out the necessary length of line to measure the distance to competing balls. After this is done it is necessary to unsnap the crank and rewind the line. This is best done by holding the divot repair prongs 10 as shown in FIG. 6, letting the line 35 run through the fingers of the same hand so that a uniform tension is applied to the line as it is rewound. When this operation is complete the crank and the hook/clamp are snapped back into place and the tool is ready for the next divot repair or the next measurement.

SUMMARY, RAMIFICATIONS, AND SCOPE

A divot repair tool is described in the form of two steel prongs rigidly attached to a solid disc-shaped handle which provides the necessary strong grip required to do an efficient job of divot repair. In addition this tool, which is quite small enough to be easily carried in a golfer's pocket, contains a spool of fine, strong line the end of which may be hooked to the flagstick in order to measure the relative distance from the hole to two competing golf balls at a considerable distance away. The line is rewond with a crank which together with the flagstick hook snaps neatly into the disc shaped handle and becomes an integral part thereof.

Although a specific embodiment of this tool is shown in the figures above, the central idea is to provide a dual purpose tool where both functions are accomplished without compromise to each other. This is accomplished by providing a solid steel divot repair tool with a strong disc-shaped handle and providing a long distance measuring line through the use of the latest technology in man-made fibers. The form of the tool may vary; for example, the front and back covers could be made of aluminum instead of plastic, the hook/clamp could be secured to the body by different means, the small raised arrows could be indented instead of raised, and a different kind of crank could be used for retrieval.

Thus the scope of this invention should be determined by the appended claims, not the specific examples given.

I claim:

1. A golfer's divot repair and distance measuring tool which comprises:
    a disc-shaped handle rigidly attached to two strong prongs, whereby the proper twisting and prying force can be applied to sod for the effective repair of a divot caused by a golf ball, a rotatable spool of fine, man-made line contained within said disc-shape handle, attached at its outer end to a removable clamp designed to snap around a standard golf course flag stick so that the relative distance to two or more golf balls may be measured by reeling out the line, said rotatable spool containing a hinged crank by means of which said line may be rewound and said removable clamp returned to its original position where it locks said rotatable spool firmly into place and becomes a smooth, integral part of said disc-shaped handle.

2. The golfer's tool of claim 1 wherein said disc-shaped handle is no greater than one and three-quarters inches in diameter and no more than thirteen-thirty-seconds inches thick so that said tool can easily be carried in a golfer's pocket where it would be available for use at any time during a round of golf.

3. The golfer's tool of claim 1 wherein said line contained within said disc-shaped handle is at least seventy-five feet in length.

* * * * *